US012538040B2

(12) United States Patent
Do et al.

(10) Patent No.: US 12,538,040 B2
(45) Date of Patent: Jan. 27, 2026

(54) CAMERA SYSTEM ON MOBILE DEVICE FOR AUTOMATED ECCENTRIC PHOTOREFRACTION

(71) Applicant: The Hong Kong Polytechnic University, Hung Hom (HK)

(72) Inventors: Chi Wai Do, Hung Hom (HK); Grace Ngai, Hung Hom (HK); Hong Va Leong, Hung Hom (HK); Lily Yee Lai Chan, Hung Hom (HK); MK Michael Cheung, Hung Hom (HK); Yujun Fu, Hung Hom (HK); Ling Yau Kiu, Hung Hom (HK)

(73) Assignee: The Hong Kong Polytechnic University, Hung Hom (HK)

( * ) Notice: Subject to any disclaimer, the term of this patent is extended or adjusted under 35 U.S.C. 154(b) by 0 days.

(21) Appl. No.: 18/751,749

(22) Filed: Jun. 24, 2024

(65) Prior Publication Data

US 2025/0392831 A1 Dec. 25, 2025

(51) Int. Cl.
*H04N 23/90* (2023.01)
*G06T 7/00* (2017.01)
*H04N 23/20* (2023.01)
*H04N 23/60* (2023.01)

(52) U.S. Cl.
CPC ........... *H04N 23/90* (2023.01); *G06T 7/0012* (2013.01); *H04N 23/20* (2023.01); *H04N 23/64* (2023.01); *G06T 2207/10016* (2013.01); *G06T 2207/10048* (2013.01); *G06T 2207/30041* (2013.01)

(58) Field of Classification Search
CPC ........ H04N 23/90; H04N 23/20; H04N 23/64; G06T 7/0012
See application file for complete search history.

(56) References Cited

U.S. PATENT DOCUMENTS

| | | | | |
|---|---|---|---|---|
| 3,879,113 | A | 4/1975 | Howland et al. | 351/7 |
| 6,616,277 | B1 | 9/2003 | Davenport | 351/221 |
| 10,702,148 | B2 | 7/2020 | Breuninger et al. | |
| 2012/0212598 | A1 | 8/2012 | Mowrey et al. | 348/78 |
| 2013/0235346 | A1 | 9/2013 | Huang et al. | 351/208 |

(Continued)

FOREIGN PATENT DOCUMENTS

| | | | |
|---|---|---|---|
| CN | 104851065 | A | 8/2015 |
| CN | 105011898 | A | 11/2015 |

(Continued)

OTHER PUBLICATIONS

Arnold, R.W., et al., Evaluation of a smartphone photoscreening app to detect refractive amblyopia risk factors in children aged 1-6 years. Clinical Ophthalmology, 2018. 12: p. 1533-1537.

(Continued)

*Primary Examiner* — Kathleen V Nguyen
(74) *Attorney, Agent, or Firm* — Stein IP, LLC

(57) ABSTRACT

A camera system on mobile device for automatic eccentric photorefraction to measure potential refraction errors in the human eye. A mobile device such as a smartphone has one or more lenses and one or more illuminators which are used to create, capture, and measure red eye reflexes. The red eye reflex measurements are then used with a machine learning algorithm to determine if refractory error is present in the eye.

20 Claims, 12 Drawing Sheets

(56) References Cited

U.S. PATENT DOCUMENTS

| | | | | |
|---|---|---|---|---|
| 2015/0316981 | A1* | 11/2015 | Sellen | G06V 40/193<br>345/156 |
| 2016/0317025 | A1 | 11/2016 | Lee et al. | |
| 2017/0112378 | A1* | 4/2017 | Tamkin | A61B 3/0041 |
| 2017/0215724 | A1 | 8/2017 | Skolianos et al. | |
| 2021/0113079 | A1* | 4/2021 | Tomasi | A61B 3/08 |
| 2022/0076417 | A1* | 3/2022 | Bremer | G06V 10/82 |
| 2023/0240528 | A1* | 8/2023 | Nie | A61B 3/14<br>351/205 |
| 2025/0025043 | A1* | 1/2025 | Boutinon | G06T 7/0012 |

FOREIGN PATENT DOCUMENTS

| | | | |
|---|---|---|---|
| CN | 106580244 | A | 4/2017 |
| CN | 108197548 | A | 6/2018 |
| CN | 115137289 | A | 10/2022 |
| CN | 115530748 | A | 12/2022 |
| CN | 116392069 | A | 7/2023 |
| CN | 116416309 | A | 7/2023 |
| DE | 10 2007 031 923 | A1 | 7/2008 |
| EP | 3 199 095 | B1 | 9/2015 |
| WO | WO 2020211174 | A1 | 10/2020 |

OTHER PUBLICATIONS

International Search Report mailed Sep. 23, 2025, issued to International Application No. PCT/CN2025/100707.

* cited by examiner

CAMERA SYSTEM ON MOBILE DEVICE FOR AUTOMATED ECCENTRIC PHOTOREFRACTION

BACKGROUND OF THE INVENTION

1. Field of the Invention

An aspect of the invention relates to a Camera System On Mobile Device ("CSMD") for automated eccentric photorefraction ("AER.") A second aspect of the invention is a method of detecting refractive errors in the human eye by means of such camera system on mobile device.

2. Description of the Related Art

Uncorrected refractive error is the major leading cause of visual impairment worldwide affecting a large proportion of the world's population. Refractive errors can onset as early as infancy, with most typically appearing during the critical 8 to 12 years of childhood development. Although effective treatments are available to improve vision and retard myopia progression, a significant number of people are not fully corrected to their best vision.

The standard of care in vision and eye care requires regular visits to professionals such as an optometrist or an ophthalmologist for routine evaluation as early as 6 months of age. Even with existing community health promotion programs, the patient capture rate is still lacking for various reasons due to financial constraints, ignorance and/or poorly prioritized as important. In developing countries, connecting to vision care is even more difficult and costly for the majority.

Currently, refractive errors can be evaluated objectively using computerized instruments such as an autorefractor which is relatively bulky and expensive. Other conventional methods of refractive error detection can be identified using a handheld retinoscope. The retinoscopy method requires clinicians with professional training and knowledge to observe and evaluate various reflex appearance to measure and identify all the components of refractive errors (the dioptric spherical, cylindrical and axis orientation). Subjective refraction is the fine-tuning aspect in refractive error determination, which requires the patient to view a visual acuity chart at distance while a series of lenses are presented to them through a refraction unit such as a phoropter to judge whether visual acuity worsens or improves. These conventional methods require patient cooperation, which is difficult to achieve, particularly for young children and infants who are unwilling or unable to cooperate when instructed to relax in front of these unfamiliar devices.

Photorefraction is a well-recognized tool for the objective screening of uncorrected refractive error, especially in children and individuals with neurodevelopmental conditions. Unlike retinoscopy, photorefraction does not require sophisticated instruments and professional skills to perform the measurements that are prone to inter-examiner variability. Among various photorefraction techniques, eccentric photorefraction is the most common method as it covers a wider range of ametropia and yields a higher specificity. Light rays from a camera flash are reflected by the retina, forming a bright red crescent-shaped light reflex (i.e., "red eye reflex") when a significant refractive error is present. The general optical principles of eccentric photorefraction are well known in the art. There are various photoscreeners used clinically to examine children in vision screening settings. Most of these devices require a specialized system using an infra-red or polarized light to estimate refractive errors, which makes them both costly and cumbersome to use. Current techniques using smartphones to estimate refractive errors have been proposed commercially such as GoCheck Kids (www.gocheckkids.com) Initially, these mobile applications were not designed for the general public to operate and require pupil dilation to restrict pupillary constriction to the light source in order to capture crescent images. In general, photorefraction technique is limited in the range of refractive errors that reflect back as a visible crescent. The width of the crescent is not visible in low ametropic eyes, overlooking low refractive errors (+3.00D to −3.00D), which is an extremely common power range for both hyperopic and myopic prescriptions for at risk age groups. There is also limited application value for precise readings, especially in detecting hyperopia, astigmatism, and low refractive error range.

Most mobile devices such as smartphones and tablets have a built-in camera feature to capture high-resolution color images on both the front and rear of the device with LED light features to enhance illumination. As a general-purpose camera, these offer many advantages; however, it is not generally suitable when applied as an eccentric photorefraction tool:

1) The lens-to-flash configuration on most models offer limited accuracy and applicability as an ideal model for eccentric photorefraction.
2) The typical image processing tools and filters incorporated into smartphone cameras and photo apps can over-process the images in many areas such that crescents may often be 'faded-off'.
3) The pre-flash function to achieve a "red-eye reduction" effect by causing the pupils to constrict is highly undesirable as it defeats the purpose of acquiring a retinal reflex in eccentric photorefraction imagery.

Given the mismatch between these constraints and typical mobile device camera hardware, a camera lens-to-flash design and image processing algorithm to generate a more user-efficient refractive error monitoring solution would be a useful invention. An optimal camera configuration using smart device-based technology to provide a more enjoyable detection and monitoring solution, while covering various degrees of refractive errors, without needing pupil dilation for users would likewise be a useful invention. An improved method and device for smartphone-based photorefraction which could facilitate the delivery of vision care services to the needy, including children, particularly in remote areas around the world would also be a useful invention.

SUMMARY OF THE INVENTION

Aspects of the present invention provide for the use of a smartphone camera with built-in flash as an established portable technology that can be conceptualized into a rapid, more economic, and convenient eccentric photorefraction device, rendering it an ideal tool in vision screening settings. This is done with a camera lens array system, which can be secured in a mobile device such as a smartphone, and by using machine learning and deep learning training datasets and models to predict refractive error.

The CSMD comprises a host device with an image processor and a display, where camera types and configurations consist of one or more lenses spaced apart, which are configured to capture simultaneous still and/or video images along with a light source such as an LED or infra-red flash configured to provide an illumination beam directed towards a patient's eye to form a point of light on the patient's retina and be reflected by the retina into an image sensor such as a smartphone camera, and processed by an image capture software with AI-based techniques and transmitted to machine/deep learning or other AI models and algorithms (hereafter "MLM" collectively) for refractive error estimation output.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
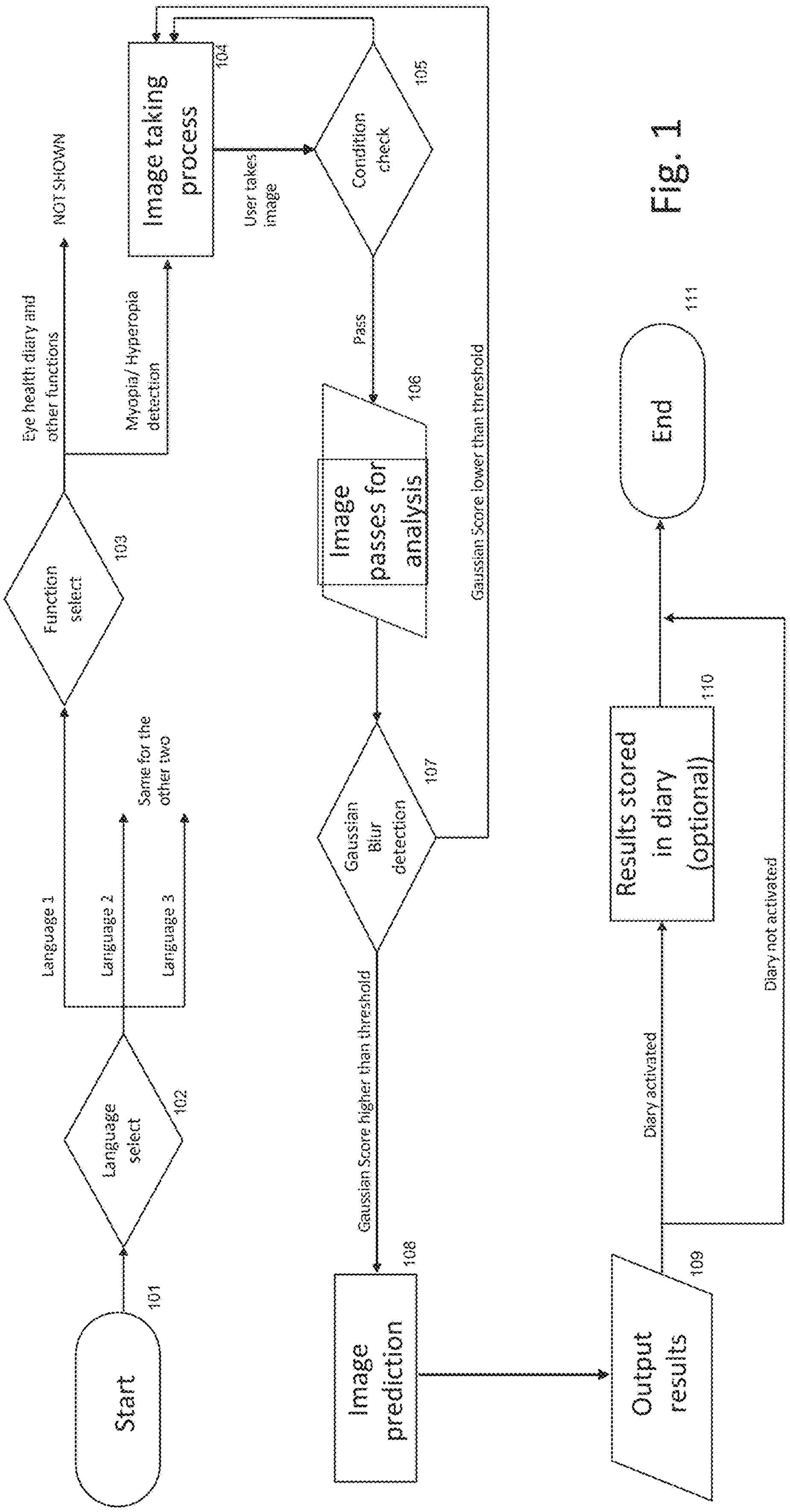
FIG. 1 is a flow chart showing the basic method of the invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

In the disclosure of the method of the invention, elements such as lenses, reflectors, LED lights, et cetera may be referenced. However, unless specifically noted, the specific types of elements described are not required, only equivalents as would be understood to be acceptable by a person of ordinary skill in the art. E.G., a Fresnel lens may be used in place of a glass lens if a person or ordinary skill in the art would anticipate that to be acceptable. Further, the CSMD is referred to simply as an CSMD: the actual embodiment of the CSMD will typically be a smartphone or similar mobile device with the necessary implementing application or "app" installed along with any required or optional additional elements.

By referring to the provided drawings and the disclosure herein, the basic method of the invention can be easily understood.

FIG. 1 shows the steps of the method of the invention.

In Step 101, the method begins.

In Step 102, a user selects a language for use with the application interface of the CSMD. Any language(s) desired may be made available by preloading it into the CSMD's control circuitry/electronic storage. Once a language is selected, the method continues, using the selected language for all subsequent interaction and display.

In Step 103, the user selects a function, either proceeding with the primary method of the invention or selecting an optional additional feature of the CSMD. If the primary method is selected, the method proceeds to the detection of myopia and/or hyperopia in a patient's eyes in Steps 104 and after.

In Step 104, the image taking process begins. The user uses a guide screen of the application (see FIG. 2) to take a photograph of the patient's face with the eyes in a predetermined position and at a predetermined distance.

In Step 105, the application indicates whether all conditions for taking the photograph are met. (See FIG. 2.) Once the conditions are met, the photograph is taken, the method proceeds.

In Step 106, the photograph is analyzed to ensure that it meets all necessary parameters for use in AEP by applying a Gaussian blur algorithm and/or other appropriate algorithm(s) and the method proceeds.

In Step 107, the analysis is checked to see if an excessive amount of blur and/or other determination of insufficient image quality as determined in Step 106 exists. If so, the application indicates that the photograph must be retaken and returns to Step 104. Otherwise, the method proceeds.

In Step 108, the image is processed with an MLM to determine whether myopia or hyperopia is present in either eye, and if so, the refractory error for correction is computed (see below.) Otherwise, the method proceeds.

In Step 109, the results of the calculations of Step 108 are displayed, showing the estimated amount of any myopia or hyperopia detected and the user is given the option to run the test again. If they do, the method returns to Step 104. Otherwise, the method proceeds.

In (optional) Step 110, if a health diary or other storage format is active, the results of Step 108 are stored therein, and the method continues. The results may be stored on the CSMD, transmitted to another device, or both. Otherwise, the method proceeds.

In Step 111, the method ends (and can then be restarted for the next patient.)

Figure 2:
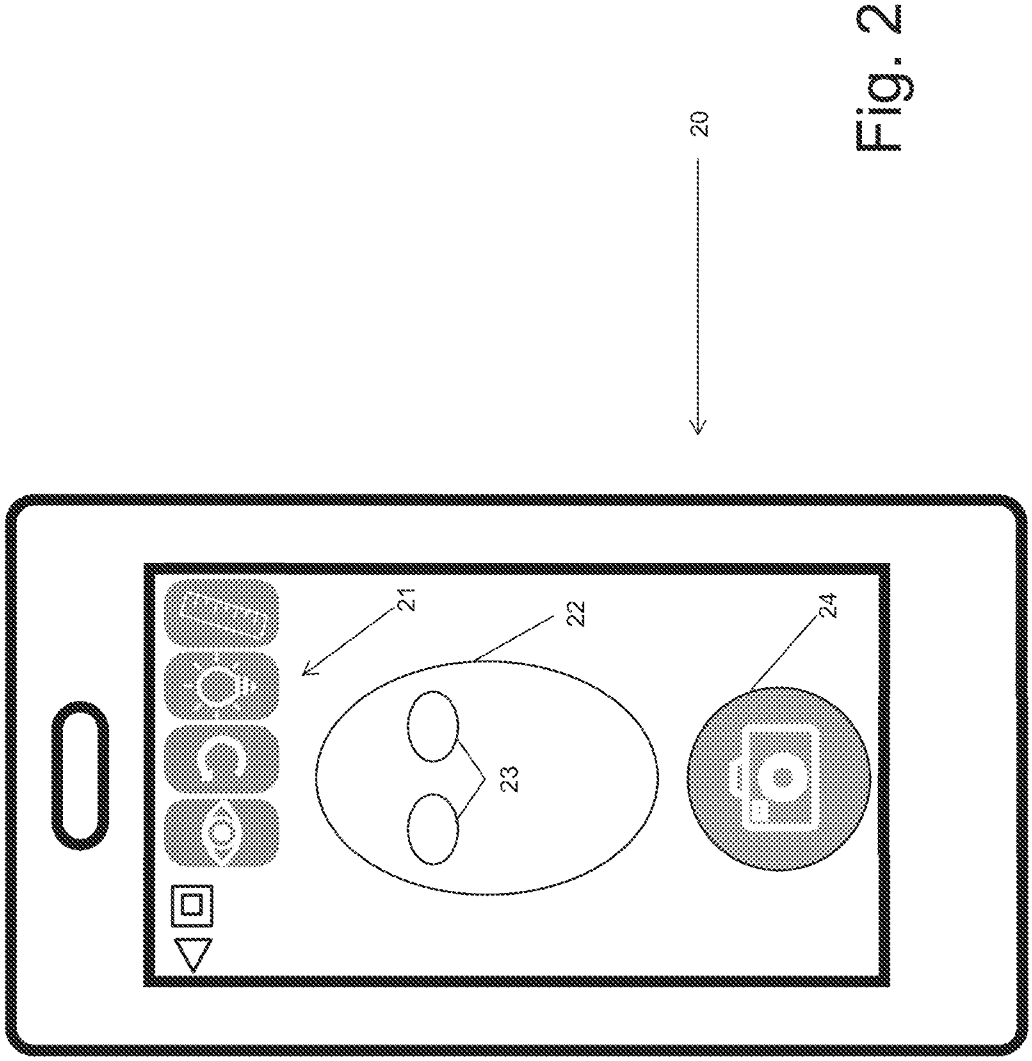
FIG. 2 is an abstracted representation of the control interface of an CSMD.

FIG. 2 shows the CSMD control screen on the CSMD. CSMD 20 has a screen showing indicators 21, face target 22, eye alignment blanks 23, and shutter button 24. To use the CSMD, the user orients the camera(s) of the CSMD on the patient using the face target and eye alignment blanks so that the face of the patient is in the proper orientation and the eyes of the patient are at the proper distance. If the CSMD has cameras on the same side as the control screen the user and the patient may be the same person.

Once the eyes of the patient are aligned, the indicators will tell the user when it is appropriate to take the photograph to use for AEP. Here, from left to right, there is an "eyes detected" indicator, "CSMD at proper angle" indicator, a "brightness" indicator, and a "distance" indicator. If any of these parameters are not at the appropriate level, the indicator will be red, turning green (or use any other determined color scheme) when the CSMD is appropriately placed. The indicators can also indicate the actual issue (e.g., indicating that ambient light is too bright or not bright enough) or just that the parameter is outside bounds. These indicators are preferred, but not required. The indicators can also avoid color usage and instead use distinguishable icons and/or printed error messages.

Once the photograph(s) are taken, AEP is performed (see below and FIG. 1.)

Figure 3:
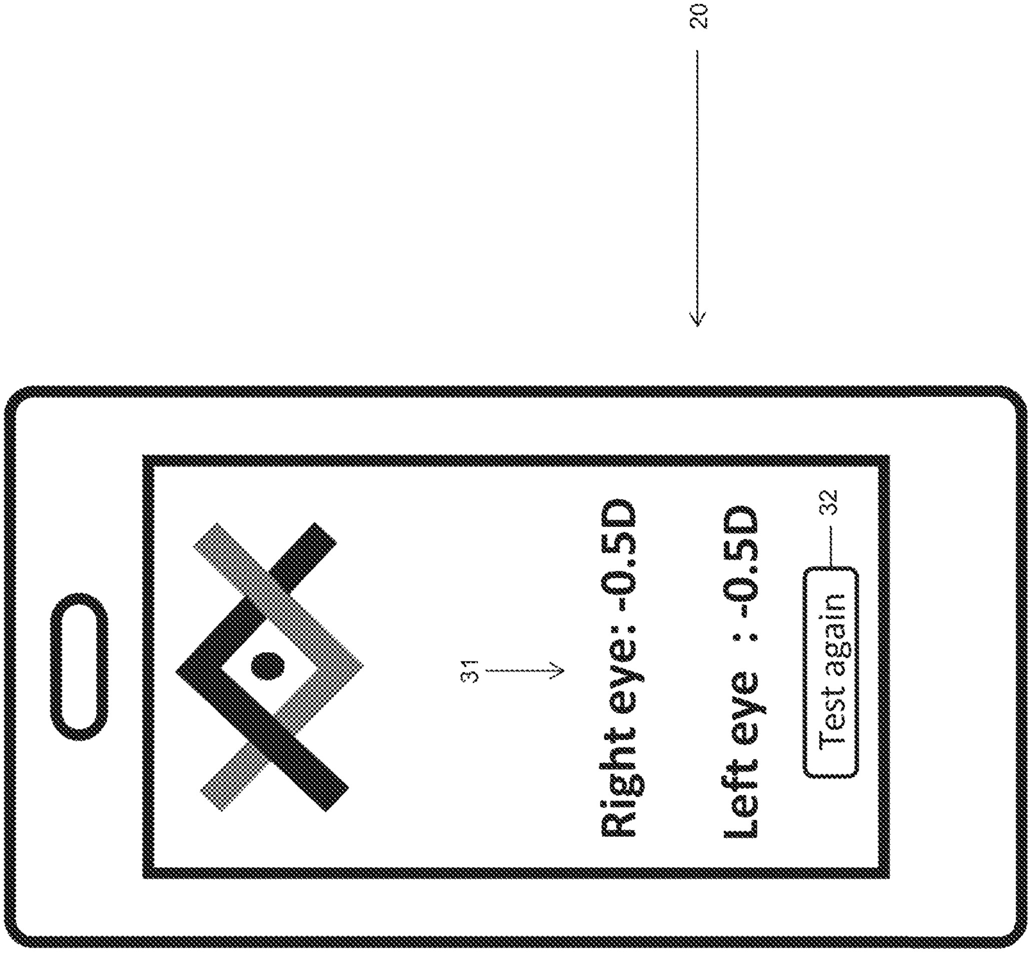
FIG. 3 is an abstracted representation of the result display of the CSMD.

FIG. 3 shows the CSMD results screen on the CSMD. CSMD 20 is displaying results 31, here showing that the refraction error for both the right and left eye is −0.50 D. These results can serve as an initial estimate of an individual's refractive error or be utilized as a baseline for screening purposes to determine whether further evaluation is necessary. This display could also show other refractive errors present in either eye, such as an astigmatism, if the CSMD can detect it by applying AEP on the photograph(s). Test Again button 32 allows the user to restart the testing procedure after the results have been noted. If the optional health diary (see FIG. 1) is used, a control on this screen can also be used to note the results.

Figure 4:
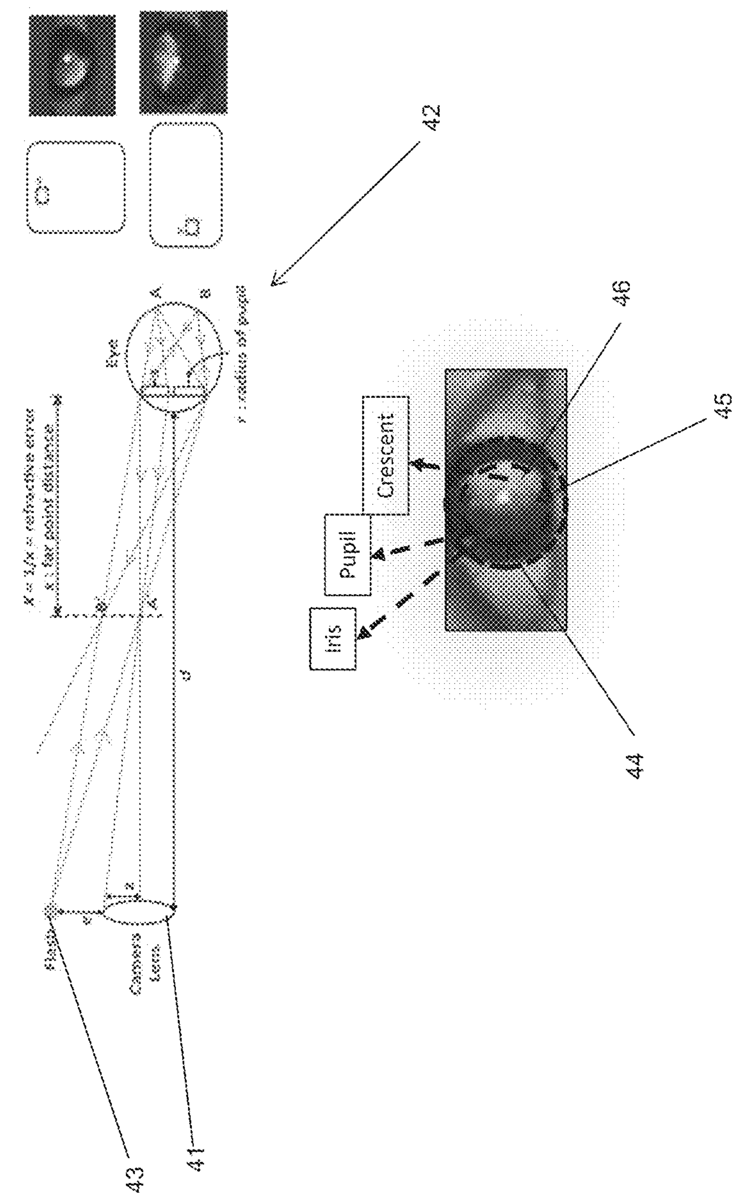
FIG. 4 is a ray diagram with examples illustrating the principles of eccentric photoreflection.

FIG. 4 is a ray diagram indicating the optics of photorefraction and examples of various results which indicate various refractive errors in the human eye. To perform the AEP, the CSMD uses the principle of eccentric photorefraction. The optics of photorefraction has long been recognized and verified in literatures dating as early as 1970s (U.S. Pat. No. 3,879,113A). It was based on classified communications technology developed in the 1960s to address communication barriers using an audio voice driven diaphragm, which was then coded into defocused light reflectance communication signals (Howland 2009). This method was further applied in visual optics, interpreted to capture the degree of refractive error in human eyes based on light reflectance. Eccentric photorefraction spun off in the late 1970s by separate study groups (Kaakinen and Tommila 1979), which has a number of advantages such as greater specificity, better suited to assess non-cycloplegic eyes compared to on-axis photorefraction—to name a few. It is well-regarded as an objective screening tool suitable for children who oftentimes dislike instruments held at close proximity because the image capture distance is often performed at 1 m or more (Bobier and Braddick 1985; Bobier 1988, Demirci et al. 2014; Arnold and Armitage 2014; Chaplin et al. 2015).

Flash unit 43 provides a source beam which is required to illicit a crescent according to eccentric photorefraction. A photograph of the eye 42 illuminated by flash unit 43 is taken through camera lens 41. This produces an image showing iris 44, pupil 45, and reflected crescent 46. An emmetropic eye will reflect a deep red fundus reflex while an ametropic eye fixating at the camera will reflect the light source as a crescent-shaped retinal reflex.

The eye has a reflective surface at its focal point where light directed into it will be reflected. It is possible to compute refractive error based on this optical principle by analyzing the degree of defocused reflectance (Howland 2009; Chan 1996). As FIG. 4 illustrates, when a flash unit source is located eccentrically next to a camera lens, an eye with a sufficient degree of ametropia will display a crescent of reflected light in the pupil margin. This crescent width(s) provides a key value to calculate refractive error of the eye ($\chi$) with the constant value of the camera's distance (d), the flash source to camera lens edge distance (e) and pupil diameter (2r) (Chan 1996; Bobier & Braddick 1985).

Commercial devices developed using this principle use infra-red or polarized light to estimate refractive error (Crescioni et al. 2015; Hunt et al. 2003). While the use of mobile phones for photorefraction had been found satisfactory and more economical than commercially available devices (Arnold and Armitage 2014; Demirci et al. 2014), a number of emerging mobile phone designs used today have limited application value for general use due to power constraints in the refractive error it can detect, and the necessity to administer medicated eye drops (cycloplegic agents) to control pupil size.

Figure 5:
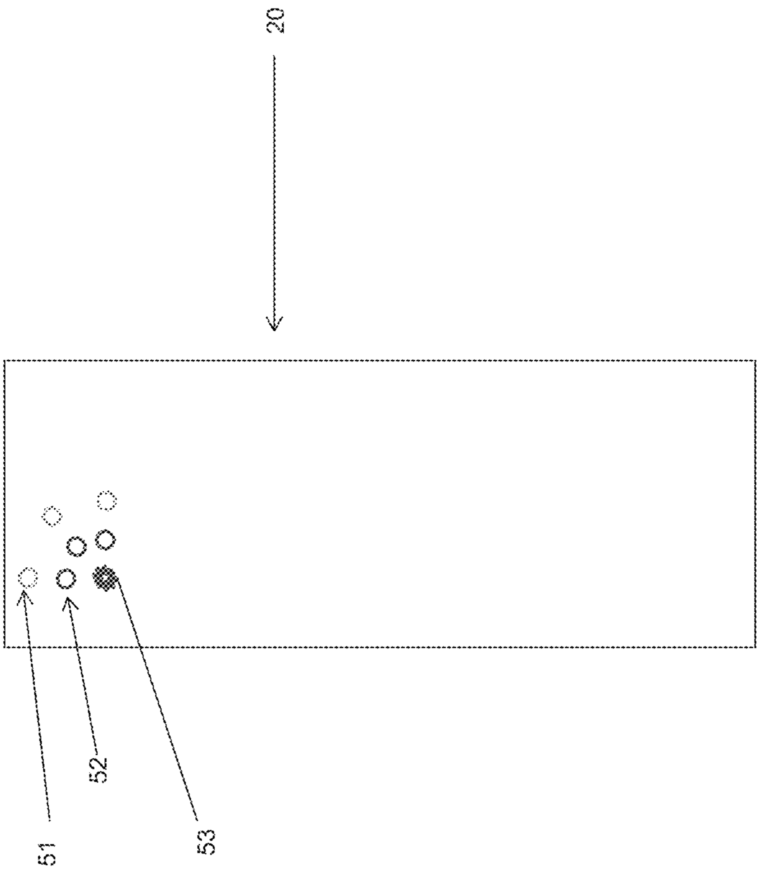
FIG. 5 is an abstracted schematic of the CSMD.
Figure 6:
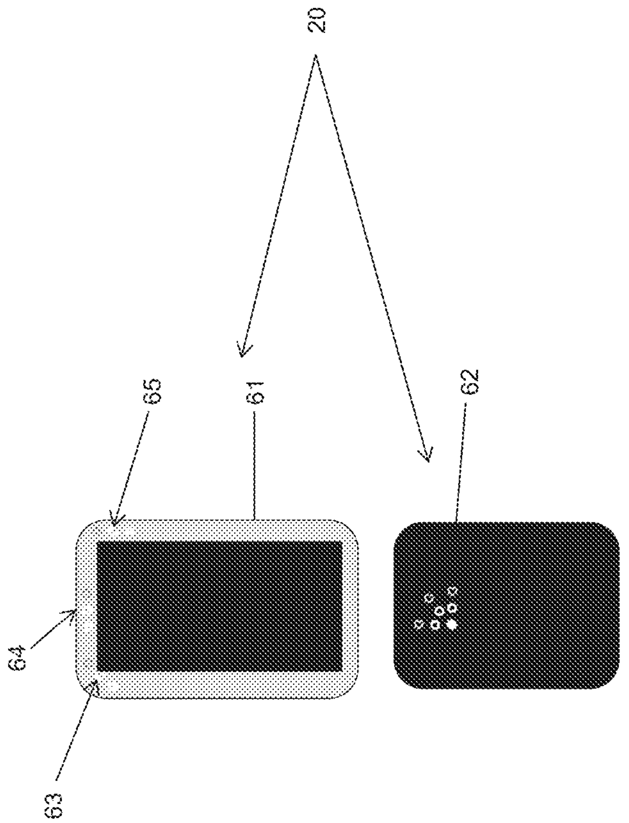
FIG. 6 is an abstracted CSMD using a typical smartphone as the base element.
Figure 7:
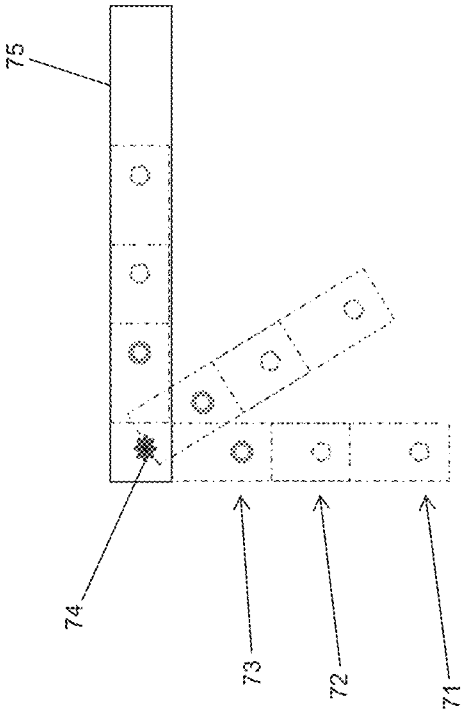
FIG. 7 is an abstracted camera and light element that can be connected to a smartphone, tablet, laptop, or similar device to form an CSMD.

FIGS. 5-7 contain further examples and embodiments.

FIG. 5 shows an abstracted CSMD with only the optical portions of the CSMD. Light source 53, typically an LED momentary flash in the visible or near-infrared spectrum, illuminates the patient's eyes. An outer ring of cameras 51 and inner ring of cameras 52 capture separate images of the patient's eyes, particularly the various reflexes which relate to refractory error in the eye.

The cameras in the rings of cameras can capture the image of the fundus reflex by photography or videography. As the geometry of the light and the individual cameras is precisely known and does not vary, the images captured by each camera can be used as described herein to perform AEP and thus determine the refractive errors, if any, present in one or both of the patient's eyes. It is preferred, but not required, that the light-source-to-lens distance be greater than 3.5 mm for optimal data collection. The camera system can be used for visual and eye care related applications such as refractive error detection, identification, monitoring, and ocular biometrics measures for one or both eyes simultaneously. This process is for capturing the still, video or 3D image(s) for user/patient in different spectra of light such as visible or near-infrared. This includes eye, head, half-body, full-body, and other images, from which the patient's eye images can be extracted. This involves the use of all types of image capturing devices operated by human or robotic system(s) combined with AI recognition. This can be triggered automatically, semi-automatically, and/or manually at any frequency, any number of repetitions, and any time intervals, with or without any hints and/or reminders for the user. This includes the use of all types of smartphones (including all brands, with or without one or more than one internal or external flash or light), all types of cameras (lens reflex camera, digital camera, point-and-shoot cameras, action cameras and other all types of cameras, with or without one or more than one internal or external flash or light), all types of tablets (including all brands with or without one or more than one internal or external flash or light), and all other image capture devices with or without one or more than one internal or external flash or light). The image(s) can be captured in any distance between the image capture device and the user. All types of triggers such as WIFI, Bluetooth and short signals are included. Any AI adjustment used for improving accuracy such as distance adjustments and feedback, stability and feedback, and lighting adjustments and feedback for users are all included. Securement of the image capturing device such as straps or other mechanisms to secure to the user and/or robotic system's hand or other parts and/or adaptation to unique environmental changes such as, but not limited to temperature control of the unit and/or gravitational tilts during operation are adapted and designed for easy, precise human hand and/or robotic hand positioning and stabilization. This includes all kinds of image and/or data inputting methods, including eye images/head images/half-body images/full-body images with one and/or more than one meridian.

It is preferred that the camera lens assembly and light source flash array design include low, mid-, and high refractive error ranges together with image capture working distance of a natural undilated pupil. The magnitude of refractive error can be derived from the following equations taking into consideration the size of light crescent(s), pupil diameter (2r), working distance (D), and eccentricity of the flash (e). It is required that the camera used be able to provide the MLM image data which is not pre-processed in such a way as to affect the AEP calculations prior to the MLM being applied. For example, the camera/hardware must not perform automatic sharpening or non-uniform color, brightness, or contrast adjustment. It is preferred that the image data be provided in "RAW" form, or as close to RAW form as is reasonably possible.

For myopia: $RRx=ee/[d(2rr-ss)]+D$

For hyperopia: $RRx=ee/[dd(2rr-ss)]-D$

Based on previous works adopted in Howland (1980), Bobier and Braddick (1985) and Chan (1994). As such, under an average non-dilated pupil diameter of at least 2 mm, the eccentricity of the flash (e) [distance between the camera and flash source] can be optimally derived with targeted refractive error measurement range of myopia and hyperopia. The captured image features from a distance of less than 3 meters should yield image recordings clearly of one or both eyes simultaneously, the contours of the iris, pupil, and crescent for further interpretations. In current smartphone cameras, the camera is permanently positioned extremely close to the flash unit, rendering a low e value; thus, insufficient in the degree of refractive errors that can render perceivable crescent widths(s). When the camera position is moved further away (as a function of variable 'e'), while maximizing and minimizing refractive powers (Rx for myopia and hyperopia), a derived 'e-value' of greater than 3.5 mm garners an optimal eccentricity for lens to light source positioning.

The following equation is used to enable determination of refractive errors along at least three meridians (180°, 135° and 90° axis) by the equation $FF\theta\theta=CC\times\sin 2|\theta\theta-AA|+SS$, where S is the spherical refractive power, C is the cylindrical component, A is the axis in radian, $FF\theta\theta$ is the power measured along meridian $\theta\theta$ in radians. Using the mathematical equations derived for eccentric photorefraction measurements (Wesemann, Norcia and Allen 1991), the refractive error measured along the horizontal, oblique, and vertical meridians (i.e., the 180°, 135°, and 90° axes) by the suggested lens assembly should capture within a power range of ±8.00 D. The equations are, however, based on certain assumptions and may become invalid when the refractive error is higher and/or the camera aperture size is too small.

For the power meridian features needed, the lens assembly system should comprise of at least one lens coupled with a light source flash described as follow: At least one lens is positioned such that its orientation sits at the horizontal, oblique, and vertical planes of the light source flash. A colored light identification marker on the lens panel is positioned to serve as a resolvable fixation marker for the patient, needed during the image capture process along each meridian. This proposed configuration to embed with a smartphone-based system represents an eccentric photorefraction screening tool in identifying hyperopia, myopia, and astigmatism without the use of cycloplegic agents. An infrared light source can be incorporated in lieu of visible light to minimize pupil constriction effects affecting the size of the retinal reflex that can be interpreted especially in videography eccentric photorefraction of the embodiment. The camera system may also comprise of external elements as shown in FIG. 6. For example, an additional camera lens assembly system for receiving the light source and/or additional light assemblies to enhance the light source.

As is known in the art, in eccentric photorefraction, there is a limitation where refractive errors fall within the range of what is known as the "photorefractive dead zone" and will not produce any light crescent. The relationship between refractive error, working distance, pupil diameter and the eccentricity of the flash when a crescent is formed at this critical point has been previously derived (Howard 1980; Chan 1996) to show the minimum refractive error required to produce a crescent. No crescent will be observed if the refractive error is smaller than $(2r+e)(2nd)-1$ in a myopic eye, or $(e-2r)(2nd)-1$ in a hyperopic eye. Since the minimum refractive error required varies with working distance, pupil diameter and eccentricity, these values can be manipulated to reduce the photorefraction dead zone accordingly. It is required that this be done to the degree necessary to provide good base image capture data.

The prior art related to the use of eccentric photorefraction for determination of refractory error is largely restricted to the determination of spherical error. In order to estimate the presence/absence of astigmatism, at least three photos taken at a different orientation such as on a 180°, 135° and 90° axis, with respect to the frontal view eye orientation (180°) are required. Given this need for multiple images, which may not be practical for younger children with lower attention span, to obtain the best results for use with such patients it is preferred to either capture the required images simultaneously with multiple still cameras at the proper orientation, or to use videography image superimposition on an eye simulator model.

FIG. 6 shows an CSMD embodied in a typical smartphone form factor. CSMD 20 has front 61 and back 62. Back 62 has a similar light/camera arrangement as shown in FIG. 4. Front 61 has three camera groups 63, 64, and 65 each containing a light and two offset cameras. For a patient other than the user, the user takes the images for AEP with the light/camera group on back 62. For when the user and the patient are the same person, the user uses the camera groups on front 61. The light-to-camera arrangement is along the 90°, oblique and 180° meridians with a surround-colored fixation light or border indicator around the camera lens. The camera configuration is eccentrically positioned above the flash on the vertical meridian. As is implied by the name, in all embodiments an eccentric arrangement is required to perform AEP on the captured images and compute the refractory error for each eye. CSMD with increased eccentricity are less sensitive in detecting low myopia but more suitable for the precise measurement of high myopia. The use of two camera lenses or more (with different eccentricities) can help boost the performance of the CSMD in myopia detection.

FIG. 7 shows an external capture element 75 that can be affixed to a smartphone or other device to form a complete CSMD. As in the prior figures light source 73 illuminates the patient's eyes and inner ring of cameras 74, middle ring of cameras 72, and outer ring of cameras 71 capture the images used for AEP.

FIGS. 8-12 provide further disclosure of the structure and function of the MLM.

Figure 8:
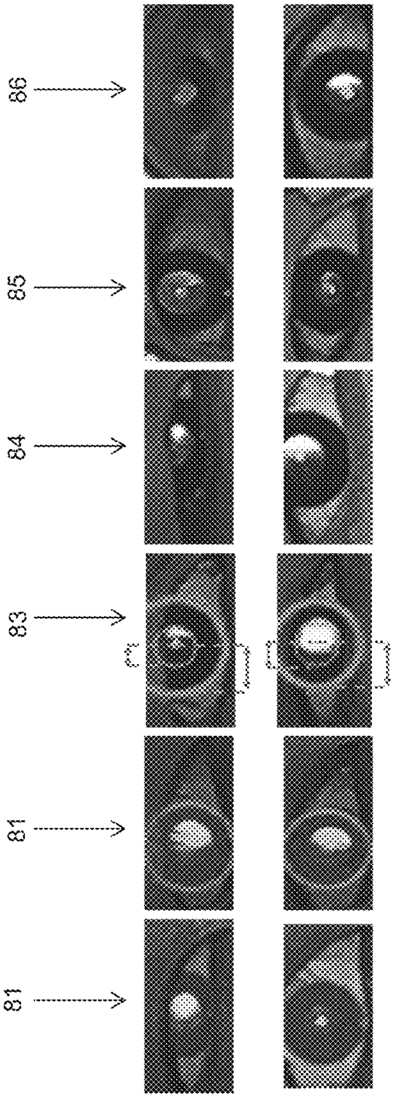
FIG. 8 shows example image captures used for preprocessing image data before computing the AEP of a patient's eye.

FIG. 8 shows various sample images which could be captured and used for the MLM's optional preprocessing stage. If preprocessing is not performed, it is necessary that the MLM have sufficient prior training to be able to process the images to compute the refractory error if any in the patient's eye(s) without such preprocessing.

Each column contains two examples of a particular parameter as shown in the image. All of the parameters are useful, but it is not required to use every single one. Column 81 is for computing eye area coverage (EAC): the eye area/the area of the whole image. Column 82 is for computing valid iris coverage (VIC): the iris area without occlusion/the whole iris area. Column 83 is for computing the relative pupil radius (RPR): pupil radius/iris radius. Column 84 is for computing the brightness of eye area (BEA): the average intensity within the eye area. Column 85 is for computing the deviation of iris area (DIA): the horizontal distance between the iris center and the eye center. Column 86 is for computing the score of sharpness (SOS): a measure of how much the image is blurred (based on the variance of the gradient.)

Whatever parameters are used, this preprocessing can include all data and/or image pre-processing known to those of ordinary skill in the art such as signal-processing-based (i.e. Gaussian transformations, Laplacian transformation, et cetera) and/or machine learning-based and/or deep learning-based (e.g., super-resolution based on deep learning models) and all other methods (e.g., image resizing) during and/or before the model running. This process can also include AI-based image quality checking, which rejects bad quality images and provides adjustments and feedback for the user. This can also include all methods for human body, face, and eye detection, and any eye element detection including but not limited to iris, pupil, and crescent detection. All image cropping methods with or without AI techniques can also be included.

Figure 9:
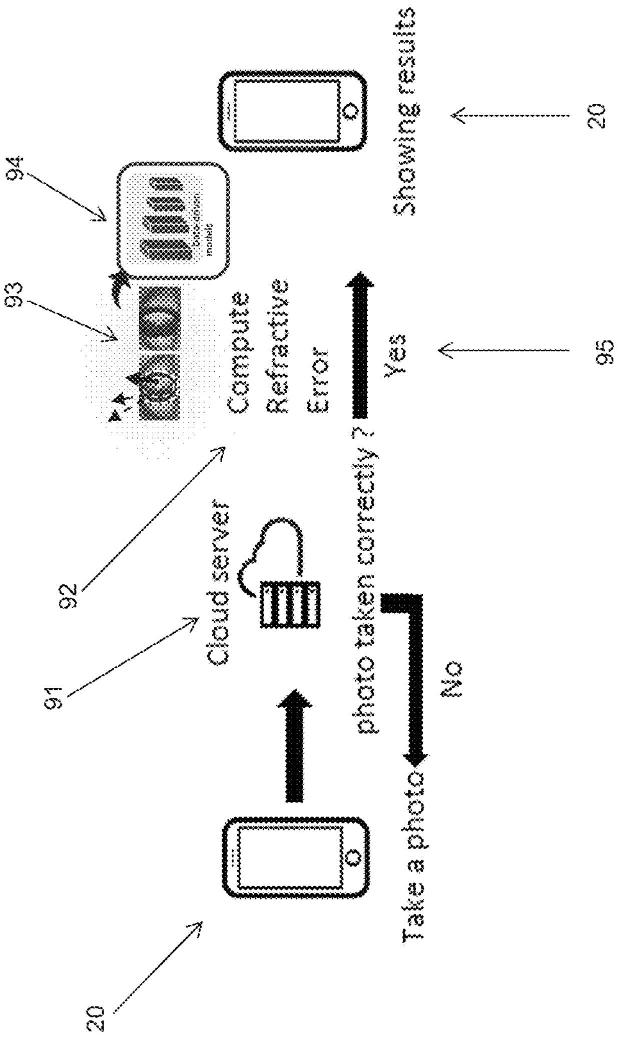
FIG. 9 is a flow diagram of the method of the invention showing the CSMD and other elements.

FIG. 9 shows an example workflow for use of the CSMD. CSMD 20 is used to take a photo, which is checked for quality. If the quality is insufficient, the CSMD is used to take another photo. Once a photo of sufficient quality is captured, the digital image(s) 93 is uploaded to cloud server 91, where the refractive error of the patient's eye(s) is computed by the MLM 92 using data-driven models 94. If the CSMD has sufficient storage and onboard computing power, this can also be done locally. If it is done remotely, it is optional to simultaneously store the result for later usage by the user, the patient, or third parties. Once the result is computed, it is displayed on CSMD 20.

For purposes of this application. MLM can include all types of machine learning methods (supervised, unsupervised, et cetera) and/or deep learning methods for predicting refractive error, with or without any kind of feature engineering and selection methods including any engineering and extracting eye elements (i.e., iris, pupil, crescent, et cetera,) and related features, such as the eye's appearance-based features (e.g., size of iris, pupil, crescent, et cetera). This can also include any method using a single model for image modelling and/or using any number of models for any number of image modellings jointly and/or separately. Further, MLM can include frameworks with one or more model backbone(s) and/or branch(es), to handle any number of input images (including images taken along one and/or along multiple meridians). Related to MLM. prediction outputting can include all types of outputting methods such as one and/or more values of the refractive error along any meridian(s,) and/or the values expressed as any combination of sphere, cylinder and/or axis, and/or any combination(s) thereof. This can also include the outputting of all kinds of confidence scores and/or result interpretation(s) and/or model visualization(s).

Figure 10:
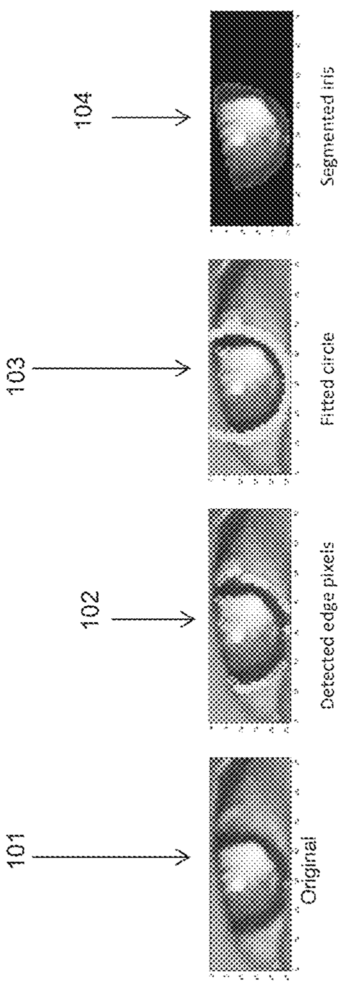
FIG. 10 shows example image captures used for computing the AEP of a patient's eye.
Figure 11:
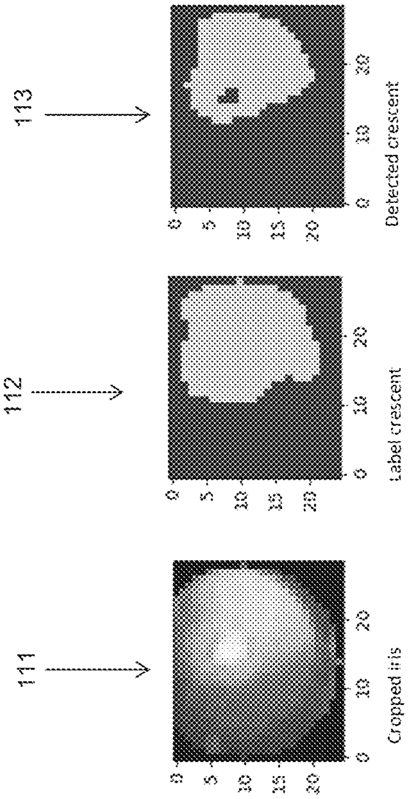
FIG. 11 shows example image captures used for computing the AEP of a patient's eye.

FIGS. 10 and 11 show example methods of processing image captures to obtain data for the pre-processing and/or processing stages of the AEP. Original image 101 is processed to obtain detected-edge pixels data file 102, fitted-circle data file 103, and/or segmented-iris file 104. These data files are then processed to obtain measurements for the relative sizes and the geometry of the eye, iris, crescent, and/or the various reflexes. Similarly, cropped iris image section 111 is used to label the crescent area in first crescent data file 112 and then to derive the detected crescent shape in second crescent data file 113.

Figure 12:
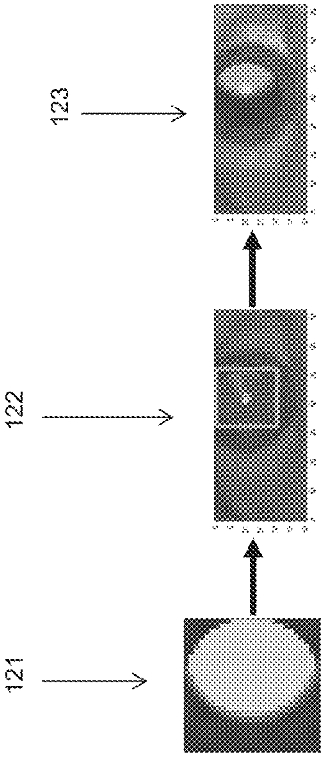
FIG. 12 shows example synthetic eye images used for training the MLM.

FIG. 12 shows a synthetic eye image made to allow training the MLM. Synthetic base image 121 is connected to first synthetic data file 122 and second synthetic data file 123 with the appropriate labeling and association with known refractory errors (not shown). A reasonable number of such synthetic base images, each associated with one or more known refractory errors, are fed into the MLM during its training to allow it to then pre-process and/or process actual data captures as shown in FIGS. 10 and 11.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A camera system on mobile device for automatic eccentric photorefraction comprising:

a base apparatus;

a processor operably connected to the base apparatus;

a group of at least one light source operably connected to the base apparatus;

a group of at least one video camera operably connected to the base apparatus in such a way that the group of light sources and the group of video cameras have a known and fixed geometric and spatial orientation, the known and fixed geometric and spatial orientation causing the group of light sources to produce reflexes from the eye of a patient;

a video storage operably connected to the base apparatus, the video storage able to store a group of one or more base videos;

a data storage operably connected to the base apparatus which can store data to be accessed by the processor;

a display;

a group of one or more controls operably connected to the base apparatus allowing a user to activate the camera system on mobile device; and an instruction storage operably connected to the base apparatus, the instruction storage containing a plurality of processor instructions executed by the processor which cause the group of light sources to illuminate the eye, the group of video cameras to capture a group of one or more base videos of the eye including the reflexes, a machine learning model (MLM) to process the base videos to compute a refractive error of the eye based upon the base videos and the reflexes, and the refractive error to be displayed on the display.

2. The camera system on mobile device of claim 1 wherein the group of video cameras comprises at least three video cameras, and the group of video cameras is offset along a 90° axis, a 135° axis, and a 180° axis relative to at least one of the light sources.

3. The camera system on mobile device of claim 1 wherein the MLM is stored locally on the camera system on mobile device's storage.

4. The camera system on mobile device of claim 1 wherein the MLM is stored remotely on a separate device and accessed via an electronic connection.

5. The camera system on mobile device of claim 1 wherein the base apparatus is a smartphone.

6. The camera system on mobile device of claim 1 wherein the base apparatus is a tablet.

7. The camera system on mobile device of claim 1 wherein the base apparatus is a laptop computer.

8. The camera system on mobile device of claim 1 wherein at least one of the group of controls in a designated area is on the display and the display comprises a touch-screen.

9. The camera system on mobile device of claim 1 wherein the user and the patient are a single person.

10. The camera system on mobile device of claim 1 wherein there is a separation of more than 3.5 millimeters between all of the light sources in the group of light sources and all of the still cameras in the group of video cameras.

11. The camera system on mobile device of claim 1 further comprising at least one fixation indicator proximal to at least one of the group of at least three still cameras such that the patient will look at the fixation indicator when the still camera captures one of the base images.

12. The camera system on mobile device of claim 1 wherein the processor instructions also cause the display to display a facial alignment target such that the user can align the face of the patient with the facial alignment target.

13. The camera system on mobile device of claim 12 wherein the facial alignment target further comprises two eye alignment targets, such that the user can align the eyes of the patient with the eye alignment targets.

14. The camera system on mobile device of claim 13 wherein a distance between the eye alignment targets is optimized to return the reflexes when the patient's eyes are not dilated medically.

15. A camera system on mobile device for automatic eccentric photorefraction comprising:

a base apparatus;

a processor operably connected to the base apparatus;

a group of at least one light source operably connected to the base apparatus;

a group of at least three still cameras operably connected to the base apparatus in such a way that the group of light sources and the group of still cameras have a known and fixed geometric and spatial orientation, the known and fixed geometric and spatial orientation causing the group of light sources to produce reflexes from the eye of a patient, and wherein the group of at least three still cameras is offset along a 90° axis, a 135° axis, and a 180° axis relative to at least one of the light sources;

an image storage operably connected to the base apparatus, the image storage able to store a group of one or more base images;

a data storage operably connected to the base apparatus which can store data to be accessed by the processor;

a display;

a group of one or more controls operably connected to the base apparatus allowing a user to activate the camera system on mobile device; and an instruction storage operably connected to the base apparatus, the instruction storage containing a plurality of processor instructions executed by the processor which cause the group of light sources to illuminate the eye, the group of still cameras to capture a group of one or more base images of the eye including the reflexes, a machine learning model (MLM) to process the base images to compute a refractive error of the eye based upon the base images and the reflexes, and the refractive error to be displayed on the display.

16. The camera system on mobile device of claim 15 wherein the group of at least three still cameras is replaced by a group of one or more video cameras.

17. A method for performing automated eccentric photorefraction with a camera system on mobile device comprising the steps of:

displaying a facial alignment target, the facial alignment target including a right eye indicator and a left eye indicator, on a display operably connected to the camera system on mobile device;

waiting for a user to align the right eye and a left eye of a patient with the right eye indicator and the left eye indicator on the display and then activate the camera system on mobile device;

illuminating the right eye and the left eye with a group of at least one light source operably connected to a base apparatus such that reflexes can be created in the right eye and/or the left eye;

capturing at least one base video of the right eye and the left eye with a group of at least one video cameras operably connected to the base apparatus and having a known and fixed geometric and spatial orientation to the group of light sources, the known and fixed geometric and spatial orientation causing the group of light sources to produce reflexes from the eye of a patient;

using a machine learning model to perform a series of correction calculations on the base videos of the right eye to compute a right eye refractive error;

repeating the series of correction calculations for the base videos of the left eye to compute a left eye refractive error; and displaying the right eye refractive error and the left eye refractive error on the display.

18. The method of claim 17 further comprising the steps of:

storing the right eye refractive error and the left eye refractive error in a health diary.

19. The method of claim 17 further comprising the steps of:

pre-processing the base images to produce pre-processing image data; and using the pre-processing image data as part of the series of correction calculations.

20. The method of claim 17 further comprising at least one fixation indicator proximal to at least one of the video cameras such that the patient will look at the fixation indicator when the video camera captures one of the base videos.

* * * * *